United States Patent [19]
Nyberg

[11] Patent Number: 4,652,379
[45] Date of Patent: Mar. 24, 1987

[54] FILTERING IMPURITIES FROM LIQUID USING MINERAL WOOL FIBER MATERIAL

[75] Inventor: Fred Nyberg, Järfälla, Sweden

[73] Assignees: Ture Hultman; Per Pedersen, both of Saltsjö-Boo, Sweden

[21] Appl. No.: 605,763

[22] Filed: May 1, 1984

Related U.S. Application Data

[63] Continuation of Ser. No. 371,191, Apr. 23, 1982, abandoned, which is a continuation-in-part of Ser. No. 193,274, May 5, 1980, abandoned.

[30] Foreign Application Priority Data

May 28, 1979 [SE] Sweden .............................. 7809355
Feb. 15, 1982 [SE] Sweden .............................. 8200903

[51] Int. Cl.⁴ ............................................. B01D 37/02
[52] U.S. Cl. ..................................... 210/717; 210/767
[58] Field of Search ............... 210/767, 716, 717, 749, 210/757; 55/97, 371, 191

[56] References Cited

U.S. PATENT DOCUMENTS

| | | | |
|---|---|---|---|
| 2,395,301 | 2/1946 | Sloan | 210/491 X |
| 3,121,698 | 2/1964 | Orsino et al. | 428/403 X |
| 3,209,916 | 10/1965 | May et al. | 210/489 X |
| 3,210,229 | 10/1965 | Feine | 210/489 X |
| 3,599,797 | 8/1971 | Mikulski et al. | 210/496 |
| 3,667,975 | 6/1972 | Teague et al. | 210/509 X |
| 3,929,666 | 12/1975 | Aiba et al. | 210/716 X |
| 4,058,456 | 11/1977 | Head | 210/23 R |
| 4,167,482 | 9/1979 | Muller | 210/411 X |
| 4,231,878 | 11/1980 | Esmond | 422/48 X |
| 4,238,347 | 12/1980 | Gancy et al. | 423/308 X |

OTHER PUBLICATIONS

Perry, R. H., et al., *Chemical Engineers' Handbook*, 5th Edition, McGraw-Hill Book Co., N.Y., 1973, pp. 19–57, 19–58, 5–54, 5–55.

*Primary Examiner*—David Sadowski
*Attorney, Agent, or Firm*—Abelman Frayne Rezac & Schwab

[57] ABSTRACT

This invention is related to a process for filtering gases or liquids for removing liquid or solid impurities and is characterized in that one uses for filtering a fibre material which partly exhibits a layer structure, said fibres along the main part of the total fibre length exhibiting a direction which deviates less than 45° from the direction of a main direction plane of said fibres, said filtering being performed so that the filtered medium is brought to flow away from the filter material through an outflow area in the filter material in which the flow direction is essentially parallel with the direction of the main direction plane of the fibres.

8 Claims, 15 Drawing Figures

FILTERING IMPURITIES FROM LIQUID USING MINERAL WOOL FIBER MATERIAL

This is a continuation of Ser. No. 371,191, filed Apr. 23, 1982, now abandoned, which is a coninuation-in-part of Ser. No. 193,274, filed May 5, 1980, now abandoned.

This invention is related to a method and an apparatus for filtering liquids preferably aqueous liquids such as raw water intended for drinking or similar, water in aquariums, swimming-pools and similar, sewage or especially final filtering of sewage water after purification, industrial water of various types such as cooling water and also other hydrophilic or hydrophobic liquids such as salt solutions, acids, such as sulfuric acid, oils, gasoline and other hydrocarbon containing products and also gases; for removing liquid or solid impurities such as sulfuric acid or fog.

The filter material used according to the invention consists essentially of fibrous materials especially of inorganic type, such as mineral wool, preferably stone or rock wool. A suitable type is basalt fibres which in addition to basalt may also comprise e.g. lime e.g. 10–30 percent by weight lime (calcium oxide) and 90–70 percent basalt or similar minerals or starting materials which give a similar final composition. Suitable main constituents are 45–50 percent $SiO_2$, 10–15 percent $Al_2O_3$, 10–18 percent $CaO$, 6–12 per cent $MgO$, 6–12 per cent $FeO$, optionally 1–5 percent $K_2O + Na_2O$ and up to 1–3 percent $MnO$ and up to 1–3 percent $TiO_2$. An example is 47 percent $SiO_2$, 14 percent $Al_2O_3$, 1 per cent $TiO_2$, 8 percent $FeO$, 16 percent $CaO$, 10 percent $MgO$, 1 percent $MnO$, 2 percent $Na_2O$, 1 percent $K_2O$. The fibre material is perferably bound with a resinous binder and non-hydrophobic or is made hydrophilic.

The filter material used according to the invention may comprise the fibres essentially randomly oriented in a three-dimensional network, but e.g. the method of production may make the fibres more or less oriented in the direction of a plane, e.g. randomly oriented in said plane. Thus, preferably about 50–90 percent and especially 60–80 per cent, e.g. about 70 percent of the fibres may be directed in the direction of a plane, e.g. a plane on which the fibres are laid down in a more or less irregular network of crossing, short fibres in the shape of e.g. a layer or web which usually is then compacted e.g. between said surface and a compacting roll. Said percentage of the fibres may form an angle of less than 45° in relation to said plane and especially an angle of less than 30°, especially an angle of less than 20°. The rest of the fibres are suitably randomly oriented in other directions.

The fibre thickness of the filter material may vary within broad limits but is preferably mainly within the range of about 1–20 $\mu m$ and especially 1–10 $\mu m$, especially a thickness of about 2–7 $\mu m$, with which is meant that the fibres along a main part of the fibre length have a thickness within said range.

The density of the filter material in non-compressed condition or in the compressed condition used for filtering is suitably within the range up to 200 kg/m³ and preferably up to 150 kg/m³, e.g. up to 120 or 100 kg/m³ and can exceed 40 or 50, e.g. exceed 70 or 90 kg/m³.

The filter material should also exhibit a certain stiffness which may be expressed as compressibility in percent under a stated load per surface area, calculated e.g. normal to the plane of a fibre filter web or main direction plane of the fibres according to the definition above: a total compressibility under a load of 0.05 kp/cm² (=0.5 m water head) on the upper surface of a cylinder with a height of 100 mm and a diameter of about 100 mm of at most 50 percent, preferably at most 40 percent, especially at most 30 per cent and normally at most 10–20 percent in dry or wet condition.

Filtering through the fibre material may be performed in such a way that the filtered medium is withdrawn from the filter material in a direction which is essentially in the main direction of the plane of the fibres according to the definition above or so that the liquid flows essentially in said direction through the filter. The fibre material is suitably prepared as a web and the plane of the web may be regarded as the main direction plane. The web is cut into suitable pieces, usually in a right angle to the direction of the web (and optionally the main direction plane of the fibres). A body of such a filter material or filter web is suitably arranged in a filter holder provided with one or more outlet means which permit the withdrawal of the filtered media through the outer surface of the filter body, e.g. arranged transverse to or perpendicular to the direction plane of the web or fibres, preferably a flat surface of said body.

BRIEF DESCRIPTION OF THE DRAWINGS

FIG. 2b is a view from above of the filter holder of FIG. 2a.

DESCRIPTION OF THE PREFERRED EMBODIMENTS

Figure 1:
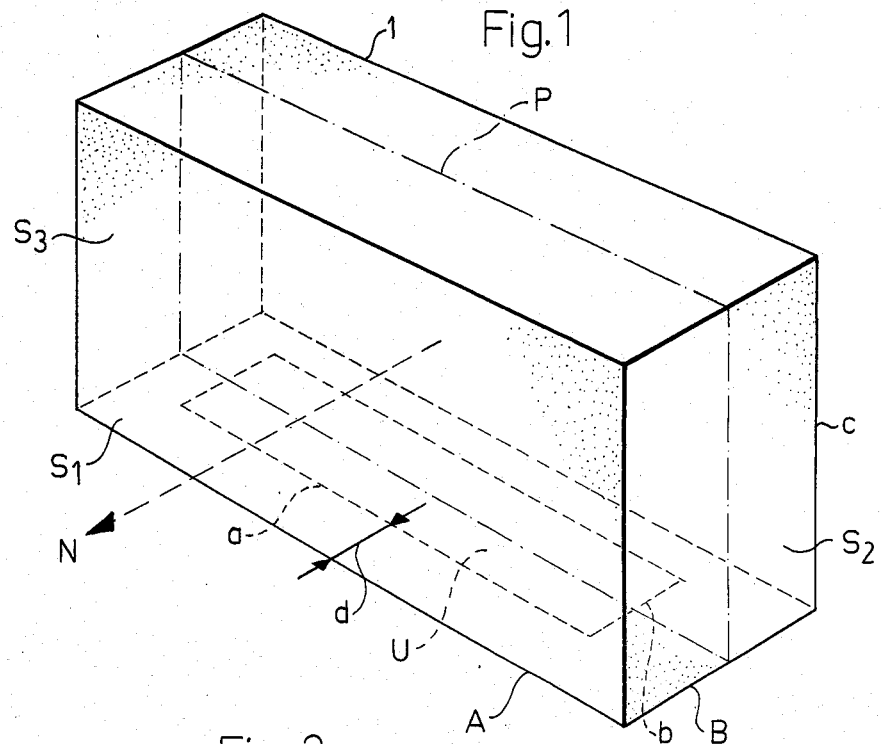
FIG. 1 shows a body of filter material.

FIG. 1 shows a body of filter material 1 with a bottom surface $S_1$ with the sides A and B, and a vertical side surface $S_2$ with the sides B and C and a second vertical side surface $S_3$ with the sides A and C. The side $S_3$ may be parallel with a main direction plane P of the fibres or consists e.g. of the side surface of a web material prepared e.g. by spinning or spraying a melt to fibres and directing said fibres against a support belt (lay-down belt) or surface. The direction perpendicular to said plane N is shown on the figure.

According to the invention the filtered medium is withdrawn through one or more of the side surfaces $S_1$, $S_2$ or optionally $S_3$. On FIG. 1 hypothetical outlets U with sides a and b are shown with broken lines.

Usually the filter material is used in the form of bodies with flat rectangular or square side surfaces which are mutually perpendicular, but of course it is also possible to use filter pieces of other shapes arranged so that the filtered medium flows out from the filter body through the surface e.g. in the main direction plane.

It is preferable that the outflow opening U is restricted by lines at a certain distance d to the peripheral line of surface $S_1$, through which one achieves that the filtered medium which is supposed to have free access to the main part of the surface $S_3$, is forced to flow through the filter material for a certain distance along the path to the outlet U. The distance d is suitably at least 1 or 2 cm or even at least 4-5 cm, e.g. 1-5 cm, preferably about 2-4 cm. Thus, a shortest flow path of 1-5 cm, preferably about 2-4 cm through the filter material is usually desired in order to give a sufficient filtering effect. Said distance may comprise a direction prependicular to the plane P. If the flow is in the direction of plane P a larger minimum flow path extension is usually desired e.g. up to 10 cm and preferably at least 1-3 cm.

Figure 2A:
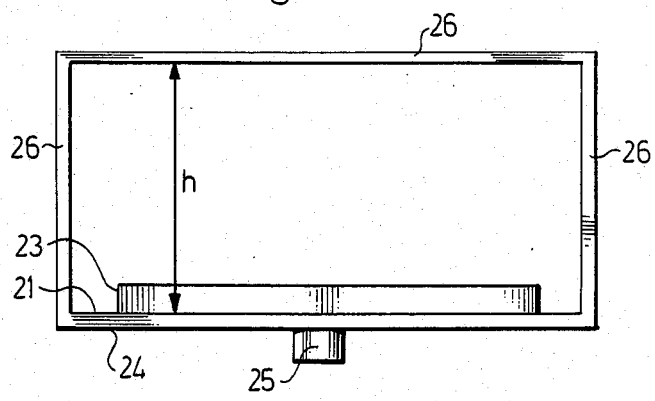
FIG. 2a shows a side view of a filter holder.
Figure 2B:
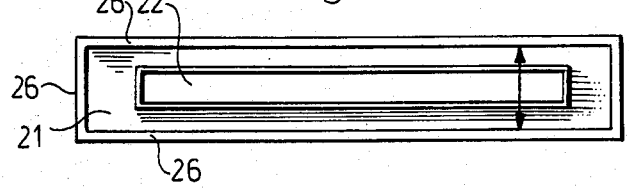

FIG. 2 shows examples of suitable filter holders. FIG. 2a shows the filter holder from the side and FIG. 2b from above. The filter holder comprises a bottom plate 21 of extended shape with a lengthwise extending opening 22 formed by a flange 23 extending upward from the bottom plate 21. Below the bottom plate 21 with the opening 22 is a box 24 with an outlet 25 in the shape of a short tube. A framework 26 protrudes from the bottom plate 21. When using the filter holder a filter slab F is arranged in the frame 26 so that an outlet surface of the filter slab F is in contact with the outlet flange 23. The filter slab is preferably urged into the frame so that the flange 23 penetrates a short distance into the fibre body, e.g. at least 1 or 2 and e.g. up to 20 or 10 mm, e.g. into a surface which is perpendicular to the main direction plane of the web or fibres e.g. the side surface $S_1$ on FIG. 1. Hereby the seal between the filter material and the filter holder is improved and the filtered medium is forced to pass through a sufficient thickness of the filter material before it flows out through the opening 22.

The extension of the filter material perpendicular to the main direction plane of the web or the fibres, i.e. N may vary within broad limits but is usually within the range 2-30 cm and preferably 5-15 cm, e.g. about 10 cm. The extension of the filter material in the direction of the fibre or web plan may also vary within broad limits, partly depending upon the thickness in the direction N. The extension h in a direction perpendicular to the flow-out opening or flow-out surface of the filter may e.g. be 1-10 times the thickness t and preferably 2-4 times said thickness, e.g. 3 times that thickness. The extension in the direction h should be selected so that the filtering effect of the entire filter can be used, i.e. not larger than an extention which permits deposition of an essential quantity of filtered material in a part of the filter material remote from the outflow opening before parts of the filter material closer to the flow-out opening are clogged to such an extent that the flow of the filtered medium through the filter material from the remote parts to the flow-out opening reaches an unacceptably low level. Common values of h are up to 1 m, preferably up to 0.8 m, in some cases up to 0.6 or 0.4 m. h should usually be at least 0.05-0.1 m, preferably at least 0.2 m, in many cases 0.4-0.6 m, but at least large enough to give a sufficient filtering effect.

In order to improve the flow through the filter from the outer part of the filter, which is the most active for the filtration, to the outflow opening through the inner parts of the filter material, the inner parts of said material may consist of a more pervious material that the outer parts. Furthermore, channels which improve the flow of the filtrate to the outflow area of the filter material may be formed in the inner parts of the filter material. Said channels may e.g. be achieved with elongated means which are pressed into the filter material in the direction of the main direction plane of the fibres essentially in the direction towards the outflow opening or outflow area of the fibre material. Said means can optionally remain in the filter material in which case they should preferably have such a shape that paths or channels with reduced flow resistance are formed in the filter material, preferably paths extending from the outflow area of the filter and into the filter material. As examples of such channel shaped means may be mentioned: perforated tubes preferably provided with a point, rods of star shaped e.g. cross shape, cross section, etc. Said means may be arranged fastened in the filter holder or inserted into the filter material before said material is arranged in the filter holder.

Figure 3:
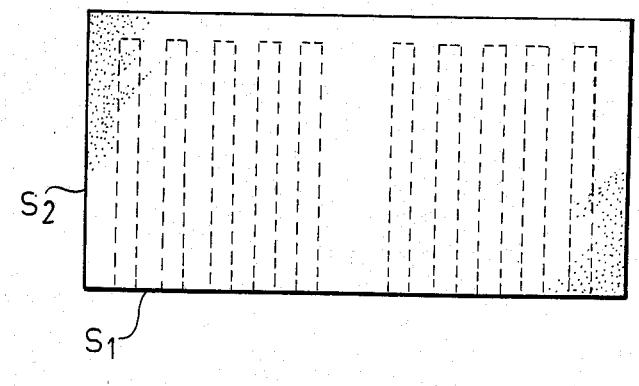
FIG. 3 is a side view of a filter defining plural parallel holes.

One way to improve the permeability of the filter in the desired flow direction, preferably the main direction plane of the fibres, is to form or shape elongated channels in said direction in the inner parts of the filter layer especially in the centre of said layer. Said channels may e.g. be bored or drilled into the filter layer from a side surface which is perpendicular to the main direction plane of the fibres, e.g. the side surface $S_1$ on FIG. 1, e.g. in the form of a number of essentially parallel holes such as is indicated on FIG. 3 which shows a side view of a parallel epipedical piece of filter material. The holes or channels may e.g. have a diameter of up to 50 mm, preferably up to 30 mm or up to 20 mm. The lower limit depends on the desired flow rate and may e.g. be 5 mm or 10 mm. The distance between the holes may vary but may e.g. abount to 0.1-10 times the thickness of the filter layer, preferably 0.2-2 times said thickness, e.g. 0.5-1 time said thickness (B on FIG. 1). The filter material should preferably have such a stiffness or the diameter of the holes should be selected sufficiently large so that the filter material remains self-supporting and retains its shape under the influence of the flow-through forces, i.e. so that said holes remain open and with a sufficient cross section under the influence of the flow speed which is foreseen for the filtration and are not collapsed by the pressure difference. Said holes may also be supported with means which are inserted into the holes as mentioned above.

Figure 4A:
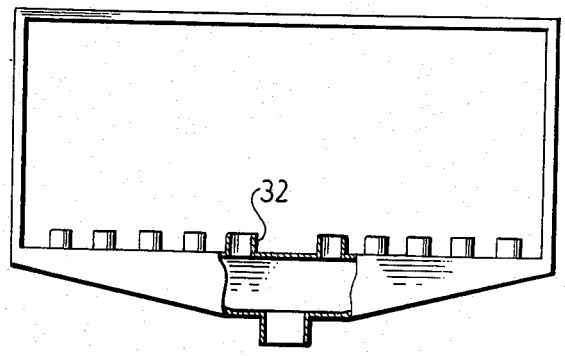
FIGS. 4a and 4b show an alternate embodiment of a filter holder.

The filter holder shown on FIG. 2 may be modified in many ways, e.g. with some other shape of the support of the outflow area of the filter in which case the opening 22 on FIG. 2 can be substituted with two or more openings with support for the filter material in between, e.g. a mesh or an expanded metal sheet, or a surface or sheet provided with round holes or holes of other shape. FIG. 4a and b show a bottom surface 30 provided with a number of round holes 31 with upwardly extending flanges 32, which are intended to penetrate into the side surface $S_1$ according to FIG. 1 of a filter slab and act as number of outlets from the filter arranged in a row. Said outlet openings 31 may also cooperate with and preferably be arranged coinciding with channels or holes in the filter slab which are perpendicular against the bottom surface 30 and improve with penetration.

Furthermore, the filter material may be provided with an extended surface area, e.g. formed by recesses. In a filter prepared from a web material, the area extending recesses, such as slots, holes, etc., are preferably formed extending from both side surfaces of the web to a suitable depth e.g. to ⅓ or ¼ of the thickness from each side surface. The area increase can be combined with a penetration improving way of forming the core of filter material e.g. with a more pervious material in said core or by forming flow-through channels in the core of the filter material as mentioned above. A filter material of sufficient thickness should of course be left to remain between the area increasing recesses and the flow-through channels or similar means.

The area increase may also be achieved by inserting means from the side surface of the filter which open up recesses in the side surfaces of the filter material. Said means may consist of parts of a holder. The inserted means consist of a number of spikes or teeth or similar means, preferably pointed spikes or teeth of sheet metal material which may be punched and bent up from the surface of a sheet in right angle to it. Preferably said surface increasing or surface opening means are inserted to a depth of up to half the thickness or more, e.g. up to 10 cm, up to 5 cm or up to 3 or 2 cm. The minimum depth may vary, e.g. at least 0.5 cm, at least 1 cm, at least 3 cm, at least 5 cm or may also amount to a certain part of the thickness of the filter layer e.g. at least 0.1, at least 0.2, at least 0.4 times that thickness. The recesses or surface increasing shapes are also arranged so that a sufficient minimum filter thickness remains to optional internal flow improving channels etc. in the inner part of the filter slab, e.g. at least 1 cm and preferably at least 2 or 3 cm remain to said means so that a sufficient filtering effect is ensured.

In order to improve the flow through the core of the filter material one may also in the middle of the filter material in or after the production step by joining to pieces of filter material arrange a central flow improving means, e.g. perforated corrugated cardboard or a similar means. Said means is thus arranged in the middle of the filter layer and essentially parallel with the main direction plane of the web. Said layer may extend to all side surfaces of the filter material which are perpendicular to the main direction plane or may be embedded so that said layer extends to only three, two or one or optionally not to any of said side surfaces.

A filter according to the invention can be operated with high filtering flow speed of the liquid. A flow speed, calculated on the outer surface of the filter, of above 10, usually above 20 and in many cases above 50 or even above 100 meters/hour or higher can be used, especially with the rockwool material mentioned above, especially a material of basalt-time type. The pressure drop through the filter (hydrostatic head) may periodically or constantly amount to at least 1 m, at least 5 m, at least 10 m or at least 20 m and up to 40 m or above. Also lower pressure drops may be used, e.g. up to 500 cm hydrostatic head, e.g. up to 200 or up to 100 cm hydrostatic head. In some cases a hydrostatic head of up to 50 cm or up to 10 or 20 cm or even 1-5 cm is sufficient. The high pressure drops usually require that the main part or at least 90% of the surface of the body is subjected to said pressure.

It is also possible to arrange outside the filter material according to the invention a somewhat coarser filter material which removes coarser impurities, e.g. impurities with a size above 10 microns, 100 microns or 500 microns or even coarser impurities, e.g. with a size above 1 or 10 mm.

In practical use, especially of the materials mentioned above, the surface area load calculated on the outlet area U in most cases is from about 2500 to normally 1250-1000 meters/hour.

The height of the filter sheet from the outflow area is not restricted to the values stated above but is determined on the first hand by the manageability and may be e.g. up to 10 times the thickness or above, e.g. up to 15 or 20 times the thickness. The minimum height can also vary and is determined by practical decisions provided that the filtering effect is sufficient, e.g. 0.5, 1, 2, 3 or 5 times the filter thickness.

Figure 5:
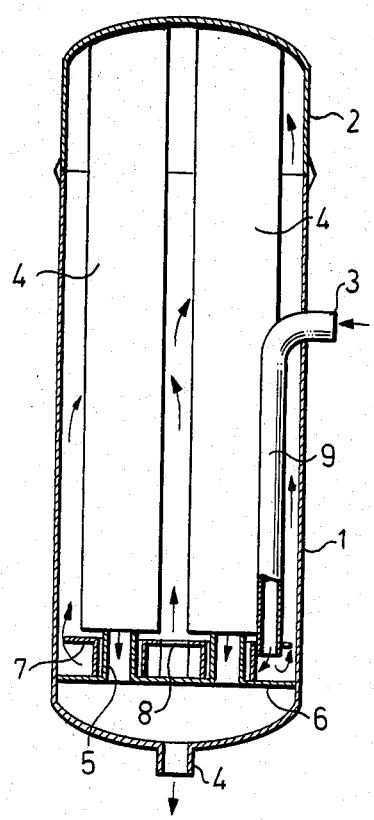
FIG. 5 shows a suitable embodiment of the apparatus and method according to the invention.

A suitable embodiment of the apparatus and method according to the invention is disclosed in detail with reference to FIG. 5. FIG. 5 discloses a vertically arranged cylindrical filter holder 1 with a cover 2, a liquid inlet 3a and a liquid outlet 3b. The apparatus is shown with part of the container wall 1 removed in order to improve the clarity of the figure. Filter material rods 4 are arranged in the container. The figure shows two such filter rods of elongated shape, e.g. 10×10 cm in cross section and a length extension which is several times the size of the side, e.g. 50-100 cm, e.g. 90 cm. One of the smaller side ends of the filter rod contacts an outlet tube 5 arranged in a wall 6 in the bottom part of the container.

Figure 6:
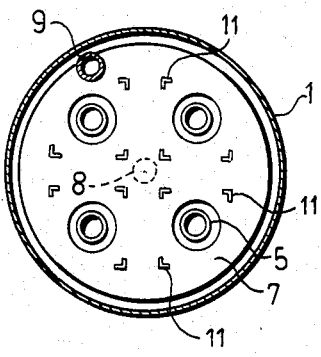
FIG. 6 is a view from above of a cross section through the container of FIG. 5.

FIG. 6 is a view from above of a cross section through the container 1 and shows the sheet 6 and outlet tubes 5 on which the filter rods shall be arranged. Support means 11 for the filter rods 4 are indicated. Said means consist of vertically arranged pieces of 90° V-section and are intended to guide three vertical edges of a filter rod with square cross section.

Figure 4B:
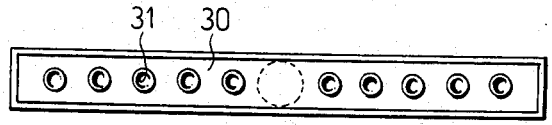
Figure 7:
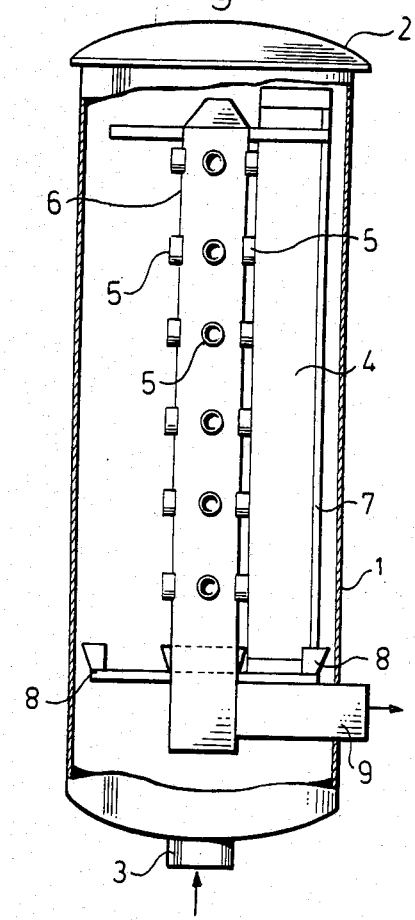
FIG. 7 shows a preferred embodiment of the device.

A preferred embodiment of the device is shown on FIG. 7 and combines the use of a pressure tight vessel 1 with a cover 2 and a plurality of elongated filter rods 4 of preferably square or rectangular cross section according to FIG. 5 with the arrangement of a number of outlet openings distributed with essentially regular interspaces along essentially a straight line urging against an elongated side surface of the filter rod shown on FIGS. 4a and 4b. The liquid to be filtered flows in through an inlet 3 which is indicated with an arrow and is distributed around the four filter rods 4 of which only one is shown in the figure. The filter rods 4 are arranged around a central tube 6 provided with 4 rows of openings 5 distributed with 90 degrees interval around said tube. Each filter rod is arranged in a filter holder frame 7 which leaves most of the outer surface area of the filter rod uncovered. The filter holders with the filter rods rest on filter supports 8 of which only two are shown on FIG. 7. The device is provided with suitable means which urge the filter holder with the filter rod sealingly against the outlet openings 5 so that liquid from the inlet 3 passes through the filter rods and through the outlet openings 5 into the outlet tube 6 and further through an outlet 9. By urging the filter rod against the openings 5 by-pass of liquid between the filter rod and said openings can usually be prevented. The rims of the outlet openings 5 may be bevelled or sharpened so that they penetrate a short distance, e.g. from a couple of millimeters to one or two centimeters into the side surface of the filter rod 4 in order to improve the sealing and prevent by-pass of liquid in the filter rod and the outlet opening.

Figure 8:
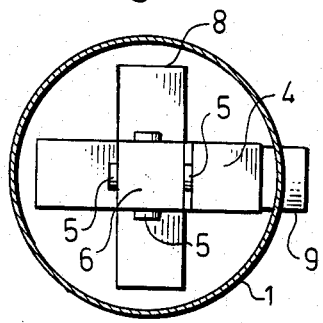
FIG. 8 shows a schematic top view of the device of FIG. 7.

FIG. 8 shows a schematic top view of the device of FIG. 7 with the cover 2 removed. The same details are given the same reference numerals in FIGS. 7 and 8. For clarity only one filter element with holder and support is shown in FIG. 8.

As in the embodiment according to FIGS. 4a and 4b the number of outlet openings 5 may vary, but a suitable interspace between the openings in a row may be 0.5 to 5 times the bredth of the filter rod against which the outlet openings urge, e.g. 1–2 times said bredth. Suitable values of the diameter of the outlet openings are e.g. 0.1–0.5 times the breadth of the filter rod, e.g. 0.2–0.4 times said breadth.

Figure 9:
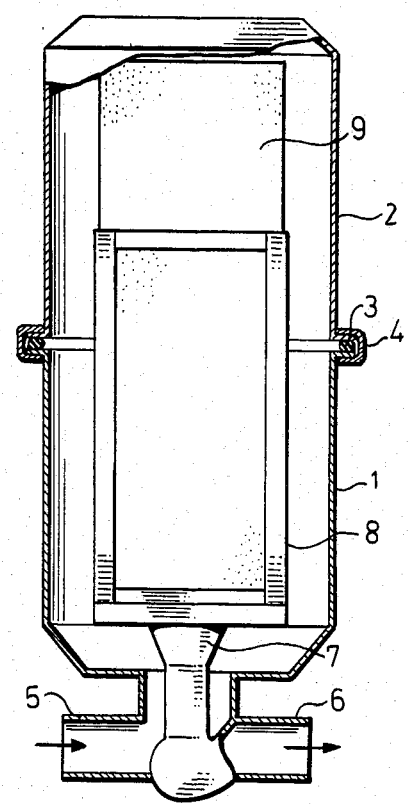
FIG. 9 shows a further embodiment of a filtering device.

FIG. 9 shows a further embodiment of a filtering device with a container base 1, a container cover 2, which can be sealed to the container base with an O-ring seal 3 and clamping means 4. The container is provided with a liquid inlet 5, a liquid outlet 6, a liquid outlet stud 7 arranged in said container and a filter holder 8 surrounding said filter outlet stud. In the filter holder 8 there is arranged an elongated body 9 of fibre filter material with square cross section and with one of the square surfaces urged against the liquid outlet stud 7 so that a liquid introduced through the inlet 5 is forced to pass through the filter body and from the filter body through the outlet stud 7 to the outlet 6.

Figure 10:
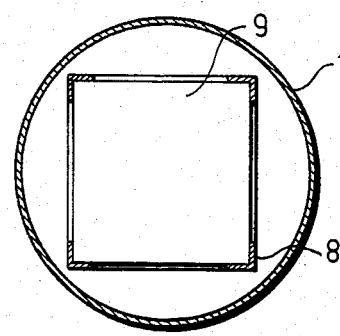
FIG. 10 shows a section viewed from above of the device of FIG. 9.

FIG. 10 shows a section viewed from above of said device, and the same numerals are used in FIG. 10 as in FIG. 9. As an example a suitable size of the filter body 9 is a cross section of 10 cm $\times$ 10 cm and a length of e.g. 30 or 60 cm.

For various filter bodies, e.g. the rod-shaped filter elements of the size 100$\times$100$\times$900 mm of the type mentioned above an inner diameter d of the outlet tubes of 20–50 and preferably 30–40 mm is suitable. In this case as in connection with other embodiments of devices according to the invention it is suitable to arrange a supporting means, such as mesh, gauze, perforated disc over the outlet opening if said opening is in contact with the filter element in order to support said element and prevent that the filter material is pressed out through the outlet opening. A flow of up to about 7.5 m$^3$ per hour is preferred under the conditions stated above, but also higher flow values, e.g. up to 10 or 20 m$^3$ per hour can be used, especially if the vertical extension of the filter is restricted to up to 60 cm.

The outlet speed in the outlet openings is selected with regard to the characteristics of the filter material and suitable values are stated above. Suitable values are e.g. 0.1–5, e.g. 0.3–2 meters/second. Under certain conditions 0.5–1.5 and especially 0.8–1.3 meters/second can be suitable.

The filter material, the method of filtering and the filtering device according to the invention are according to an embodiment characterized by maintaining a high value of the ratio of the size of the filter element inlet area to the outlet area. The value F of said ratio is usually above 10, preferably above 25, especially above 50 and frequently above 100 or above 250. For a filter rod of a square cross section and the size 100$\times$100$\times$900 mm said ratio F may e.g. amount to about 300 or above, for a filter disc of the size 900$\times$100$\times$450 mm to about 50 and for a circular filter rod of 65 mm diameter, vertical extension 100 mm to about 340. The area range referred to also corresponds to a large average distance between the outlet surface and inlet surface of the filter element and a correspondingly long flow path through the filter element, e.g. an average flow path extension or distance of at least 5 or 10 cm, optionally at least 20 or 40 cm. Frequently the flow field within at least 20%, preferably at least 40%, e.g. at least 50% or at least 75% exhibits a main composant direction which coincides with the direction of a fibre orientation plane according to the definition above.

A filter element can according to the invention be used so that the entire element acts as a filter medium. Outlets from the filter element can be arranged by applying an outlet opening of the filtering device against an outer surface of the filter element, which preferably exhibits the area ratio stated above to the inlet opening area which preferably comprises the rest of or at least 90 or 75% of the surface of the filter element. The outlet surface of the element can also be submerged into a depression in the material, e.g. in the shape of an internal channel, as disclosed above.

Figure 11:
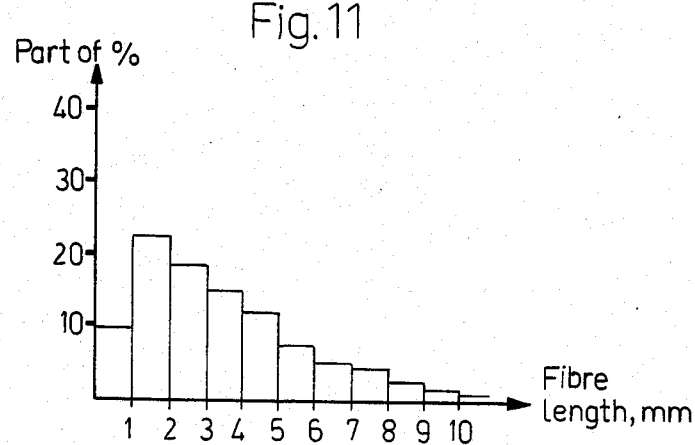
FIG. 11, FIG. 12 and FIG. 13, show suitable values of fiber diameter, length and compressibility.
Figure 12:
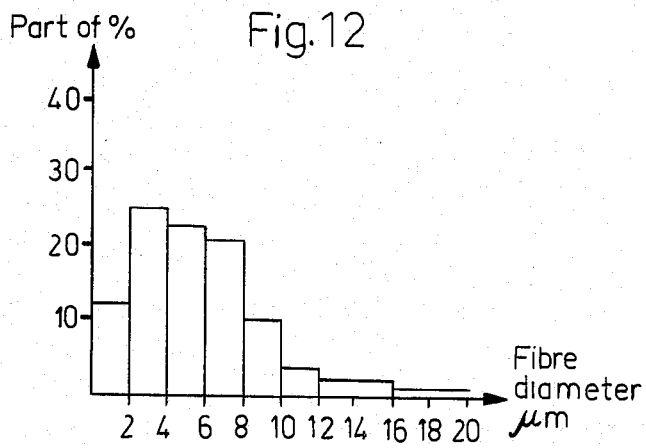

Suitable values of the distribution of fibre diameter and fibre length of the filter material according to the invention are disclosed on FIGS. 11 and 12. For a material according to the invention the values of the 5 or 6 highest of the interval columns disclosed on said figures are preferably between 0.2 and 5 and especially between 0.5 and 2 times the values of each column disclosed on the figures.

Figure 13:
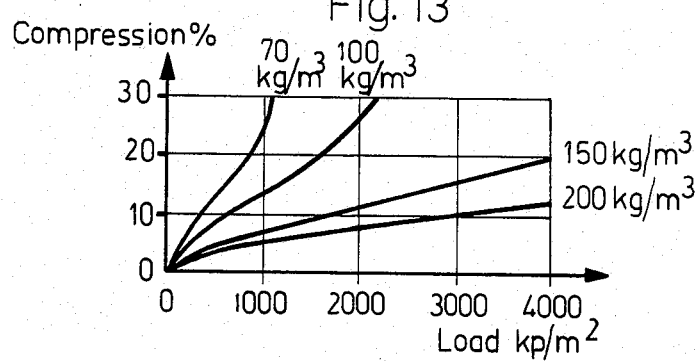

FIG. 13 shows examples of suitable compressibility values of filter materials of various volume weights. The compressibility is preferably at most 10 and especially at most 5 or at most 2 times said values.

In order to improve the permeability and other characteristics the filter material may be entirely or partly coated with or treated so that a hydrophilic surface layer is obtained on the fibres, e.g. by coating with a per se known material of said type.

Fibre main direction plane of the fibre material is also intended to comprise the lay-down plane of a fibre material which is laid down on a support surface of flat shape or other shape to form a fibre material layer, also if the fibres in the material do not exhibit the major directionality mentioned above in a particular plane but are rather randomly distributed in space, in which case the filter material layer frequently exhibits a sub-layer structure with a plurality of stacked parallel sub-layers in which the fibres may be oriented in a preferred direction, as mentioned above, or may be more or less randomly oriented in space.

According to a further embodiment of the invention filtering is performed in the presence of so-called polynucleus alumina (aluminum hydroxide), i.e. alumina comprising two or more aluminum atoms in a complex molecule, or a precursor of such polynucleus alumina or one or more compounds which in the filtered liquid, especially water or an aqueous solution, forms such polynucleus alumina or a precursor thereof. The polynucleus alumina complex molecules used according to the invention are previously known and disclosed e.g. in the Swedish Patent Applications Nos. 7805135-6, 7909512-1 and 7902651-4 and the U.S. Pat. No. 4,238,347, the disclosure of which is included by reference. According to the invention polynucleus alumina complex or additives which in an aqueous solution or in the filtered liquid or in the fibrous filter material supply such polynucleus alumina complexes are used, the number of aluminum atoms in said complex being at least 2, preferbly 3, at least 4, at least 5, at least 6, at least 7, at least 8 or at least 10, e.g. complex molecules corresponding to the formulas $Al_8(OH)_{20}{}^{4+}$, $Al_7(OH)_{17}{}^{4+}$ and $Al_{13}(OH)_{34}{}^{5+}$. The charge of said polynucleus alumina complexes thus is preferably above +3, e.g. +4 or +5 or higher. Preferably the percentage of added aluminum compounds present or available as such polynucleus alumina complex with at least 2, at least 3, at least 4, at least 5, at least 6, at least 7, at least 8 or at least 10 Al ions in the complex molecule should amount to at least 10%, at least 25%, at least 50%, at least 75% or at least 95% of the weight of alumina in the added aluminum compound.

An example of a suitable aluminum compound for use as additive is polyaluminum sulphate of the following chemical composition in % by weight: Al 7,2, Fe<0,1, alkali metals 8,3, $SO_4$ 37,2, inorganic C 2,2, water-insoluble 0,1, crystal water 29,0, in which aluminum is present as $Al_2(SO_4)_3.17H_2O$. The particle size is preferably between 0,25 and 3 mms. Alternatively can the compound be used as a store or ready-for-use solution, e.g. containing 20–35%, e.g. 22, 28 or 30% concentration and preferably with a pH of about 4, e.g. 4.1.

When using such polynucleus alumina compounds one man continuously or for an extended period of time, preferably at least 5 and especially at least 10 or at least 24 hours maintain certain minimum concentration of polynucleus alumina complex molecules with one of the minumum complex sizes mentioned above in the filtered liquid, preferably a content of at least 0,0001, especially at least 0,001, at least 0,01 or at least 0,1 $g/m^3$ (calculated as g $Al/m^3$). The maximum content may be e.g. 50, especially 20 and particularly 10 or 5 and in certain cases 1 $g/m^3$ calculated as aluminum of alumina complex molecules with at least 2 or more aluminum atoms, or materials which in the filtered liquid form such alumina complex molecules, e.g. polyaluminum sulphate or polyaluminum sulphate-chloride.

According to an embodiment of the invention a pretreatment or periodic treatment of the filter material is performed by supplying prior to the filtering operation or periodically during the filtering operation alumina complex molecules or compounds forming such molecules to the filter material, preferably by adding said alumina complex (or material forming said complex) homogeneously distributed in the filter material or in a part of the filter material, e.g. mainly within an outer part of a piece of filter material used for performing a filtering operation or alternatively mainly within an inner part of said piece of filter material. The alumina complex or the material forming such complex may be added in solid or dissolved form, preferably in an aqueous solution. One may also pretreat the filter material with a solution containing said alumina complex or a material which forms said complex in a diluted aqueous solution, and the pretreated filter material may optionally be dried. When pretreating prior to filtering or periodically during the filtering operation, preferably during a first part of the operation time of the filter material, the alumina complex or material forming such complex may suitably be added in a certain quantity by weight of the filter material volume, preferably at least 0,001, especially at least 0,01 and optionally at least 0,1 kg of polynucleus alumina, i.e. alumina compounds with a particular minimum number of aluminum atoms per complex molecule mentioned above, calculated per $m^3$ of the filter material volume. The upper level may amount e.g. at most 10, at most 5, at most 1, at most 0,5 or at most 0,1 kg Al as alumina complex with at least 2 or at least a certain number stated above of aluminum atoms per complex molecule (said Al quantities are correspondingly also valid for said additive materials, such as polyaluminum sulphate or polyaluminum sulphate-chloride or similar materials, which in aqueous solution or in the filtered liquid give the desired alumina complex molecules. Said pretreatment may be performed for a minimum period of time, e.g. at least 1 second, at least 1 minuter, at least 15 minutes, at least 1 hour, at least 5 hours, at least 10 hours or at least one day. Said pretreatment may also be performed for a certain maximum period of time, e.g. at most 5 days, at most 24 hours, at most 10 hours, at most 5 hours, at most 1 hour, at most 30 minutes at most 15 minutes, at most 1 minute or at most 10 second.

The pretreatment of the periodical treatment can be performed by recirculating a solution comprising polynuclear alumina complex through the filter or by soaking the filter in a solution of the necessary quantity of aluminum compound prior to connecting the filter into the liquid flow to be filtered. It is also suitable, when exchanging the filter, to add the necessary quantity of aluminum compound in solid or preferably dissolved form to the container in which the filter is arranged and thereafter adding water or a liquid which is to be filtered so that the aluminum compound is mixed with said water or liquid and penetrates the filter material. After filling the container and the filter with the aluminum compound solution the supply of liquid can be cut off for a certain period of time, the solution can be recirculated, or filtration can be performed with decreased flow rate for a certain period of time, e.g. the period of time mentioned above, or filtering can be continued at once with the normal filtering flow rate.

When adding polyalumina or polyaluminum compounds in a diluted aqueous solution, e.g. below the maximum content values mentioned above, it is possible to maintain a low pH value of 6,5–8,5, preferably 7–8, e.g. 7,5–7,9 or about 7,7–7,8.

When adding polyaluminum compounds in solid or dissolved form to water or other filtered liquid which is passed through the filter a certain minumum residence time of the aluminum compound in the liquid prior to passing the liquid through the filter is often preferable, e.g. a residence time of at least 1 second, at least 10 seconds, at least 30 seconds, at least 1, 10 or 30 minutes, at least 1 hour or at least 10 hours depending upon the conditions. In some cases said residence time should be at most 24 or 10 hours, at most 1 hour, at most 30 or 10 minutes, at most 60, at most 30 or at most 10 seconds. The desired residence time can be obtained by connecting a container upstreams the filter and adding the aluminum compound at the inlet to said container.

EXAMPLE 1

Polyaluminum sulphate of the type sold by Boliden AB (Boliden vattenvård), Sweden, under the trade name "PALS" in the form of a 22% aqueous solution was dosed continuously in water from a swimming-pool with a volume of 900 $m^3$ prior to the circulation pump and the filter in a filter recirculation circuit. The filter was of the type "AC 900" sold by PEHN Filtersystem AB, Saltsjö-Boo, Sweden, provided with mineral wool filters of the type "AQUA-CLEANO" (trade mark) sold by the same company and with a thickness of 10 cm×length 90 cm×height 30 or 60 cm, with a total filter inlet area of 8.4 $m^2$ and a filter material density (in th dry state) of 80–90 $kg/m^3$. For periods of time varying from 2 hours to 30 minutes from 3 to 0.5 liter of said PALS solution was dosed in the filter circuit prior to the circulation pump and pressure filter per 100 $m^3$ water corresponding to from 50 to 8 $g/100 m^3$ water or from 6 to 1 g of solid PALS per $m^3$ of water. The residence time of dosed PALS prior to the filter was less than 1 minute. The pH value decreased by said dosing from about 7.7 to about 7.6. The treatment gave good clearing effect in the water with long time activity and low pressure drop increase through the filter.

EXAMPLE 2

In the filter circuit in a swimming-pool with the water volume 450 m³ and the same type of filter as used in Example 1 but with the inlet area 5.6 m² a solution of the polyaluminum sulphate material PALS was dosed (as a 25% solution) in an equilizing tank with the volume 5 m³ arranged prior to said filter. The flow of water was 70 m³ per hour and the residence time thus about 5 minutes prior to the filter. The dosed quantity was 1 liter of said PALS solution for from 15 to 20 minutes. The pH fell from 7.9 to 7.6 during the dosing period and thereafter rose to 7.9 again. The turbidity of the water in the swimming-pool decreased markedly, as was established 12 hours later, without any noticable increase of the pressure drop through the filter.

EXAMPLE 3

The experiments according to Examples 1 and 2 were repeated but the PALS solution was dosed directly into the filter container when exchanging filter so that the PALS solution was mixed directly with the water streaming into the container when the filtering process was continued after the exchange of the filter. With quantities of PALS corresponding to those used according to Examples 1 and 2 similar filtering results were obtained.

EXAMPLE 4

In a plant for preparing potable water (drinking-water) a conventional process comprising dosing of conventional aluminum sulphate, flocculating for 30–60 minutes, sedimentation and filtering in sand filters was substituted with treatment in a filter device of the type "AQUA-CLEANO" mentioned in Examples 1–3 in combination with addition of the PALS solution mentioned in the preceding examples. Experiments were performed with dosing of said PALS solution (as a 20 or 30% solution) in the raw wate after coarse sieving for removing coarse particulate material, with a residence time of from ½ to 10 minutes prior to filtering with the same dosed quantities of PALS as in the preceding examples and with lower doses down to 0.1 liter of the PALS solution per 100 m³ of water.

Furthermore, the same type of filter was tested after pre-treatment with 1 and 10 ml of said PALS solution per liter of filter volume, and without addition of PALS or other flocculating agents to the water which has subjected to filtering in said pre-treated filter.

The experiments according to all the examples mentioned above gave good separation of organic and inorganic impurities and a long-time effect on the filter and filtering activity of the treatment with the PALS solutions, which effect was manifested as a slower pressure drop increase and high purifying effect for a more extended period of time, probably since the separating ability of the filter material could be used to a greater depth in the material since clogging of the surface layer was delayed. Furthermore, the pre-treatment with the polynucleus aluminum sulphate or aluminum hydroxide material seemed to activate the filter material to a certain depth from the surface or throughout the entire fibrous material. The invention is not restricted to any theoretical explanation, but it is possible that the polynucleus aluminum salt or polynucleus aluminum oxide material adheres to the fibres and improves bonding of solid impurities to the fibres.

I claim:

1. A process for filtering liquid for removing impurities therefrom which comprises passing said liquid through a filter body of mineral wool fiber material cut from a fiber material web with a thickness of at least 5 cm, of fibers prepared from a melt of fibers with a thickness of essentially from 1 to 20 microns, by depositing said fibers on a surface and bonding the fibers with a binder at a substantial number of points at which the fibers contact each other, said fibers, at least along a main part of a total fiber length, being directed in a direction which deviates less than 45% from a main direction plane formed by said surface, said mineral wool fiber material having a density of from 50 to 150 kg/m³ and a stiffness, expressed as compressibility under a load of 0.05 kp/cm² on an upper surface of a cylinder of said mineral wool fiber material with diameter 100 mm and height 100 mm of at most 40%, in which filtering process the liquid is brought to penetrate into said body of mineral wool fiber material through an inflow surface area comprising a major part of said body of mineral wool fiber material and is removed from said body through an outflow surface area formed by at least one outlet opening nozzle urged against a cut surface of said body of fiber material cut in a direction transverse to a direction of said web, with said nozzle arranged at a distance of at least 1 cm from a peripheral line of said cut surface of said body, the ratio of said inflow surface area to said outflow surface area of said body of fiber material being at least 10, said inflow surface area being at least 90% of the total surface area of said body, said body extending in a direction perpendicular to said outflow surface area at least 5 cm, and passing said liquid through said filter body with a flow speed, calculated on said outflow surface area of said filter body of above 10 meters/hour.

2. A process according to claim 1 in which said filter body of mineral wool fiber material is formed by melting a starting material and spinning to fibers, said filter body of mineral wool filter material comprising 4550% $SiO_2$, 10–15% $Al_2O_3$, 10–18% CaO, 6–12% MgO and 6–12% FeO.

3. A process according to claim 1 in which the ratio of the inflow surface area to the outflow surface area is above 25.

4. A process according to claim 1 in which said filtering liquid is performed in the presence at least one aluminum compound from the group consisting of complex polynuclear aluminum hydroxide compounds with 2 or more aluminum atoms per molecule and precursors which form said polynuclear aluminum hydroxide compounds when diluted with water.

5. A process according to claim 1 which comprises filtering a liquid through said mineral wool fiber filter material with a compressibility of at most 10% when measured according to claim 1.

6. A process according to claim 1 wherein said flow speed is above 20 meters per hour.

7. A process according to claim 1 wherein said liquid is selected from the group consisting of drinking water, aquaria water, swimming pool water, sewage water, cooling water and hydrocarbon containing products.

8. A process according to claim 1 wherein said filter body of mineral wool fiber is cut from a web with a thickness of from 5 to 30 cms.

* * * * *